Dec. 15, 1959     J. J. VERBRUGGE ET AL     2,917,079
FLUID POWER STEERING CONTROL VALVE
Filed Nov. 12, 1957                         2 Sheets-Sheet 1

INVENTORS.
Joseph J. Verbrugge &
BY Donald E. DeFord
J. C. Thorpe
ATTORNEY.

Dec. 15, 1959  J. J. VERBRUGGE ET AL  2,917,079
FLUID POWER STEERING CONTROL VALVE
Filed Nov. 12, 1957  2 Sheets-Sheet 2

INVENTORS.
Joseph J. Verbrugge &
BY Donald E. DeFord

S. C. Thorpe
ATTORNEY.

United States Patent Office 2,917,079
Patented Dec. 15, 1959

2,917,079

FLUID POWER STEERING CONTROL VALVE

Joseph J. Verbrugge and Donald E. Deford, Saginaw, Mich., assignors to General Motors Corporation, Detroit, Mich., a corporation of Delaware Application November 12, 1957, Serial No. 695,800

7 Claims. (Cl. 137—624)

This invention relates to fluid power steering, particularly of automotive vehicles, and more especially concerns a novel control valve arrangement for such apparatus.

Unlike the control valves presently in use, a valve conforming with the invention is characterized by rotary rather than axial movement, enabling manufacturing economies and providing operational advantages.

The invention will be described in application with reference to the accompanying drawings illustrating a preferred form thereof. In the drawings.

Figure 1:
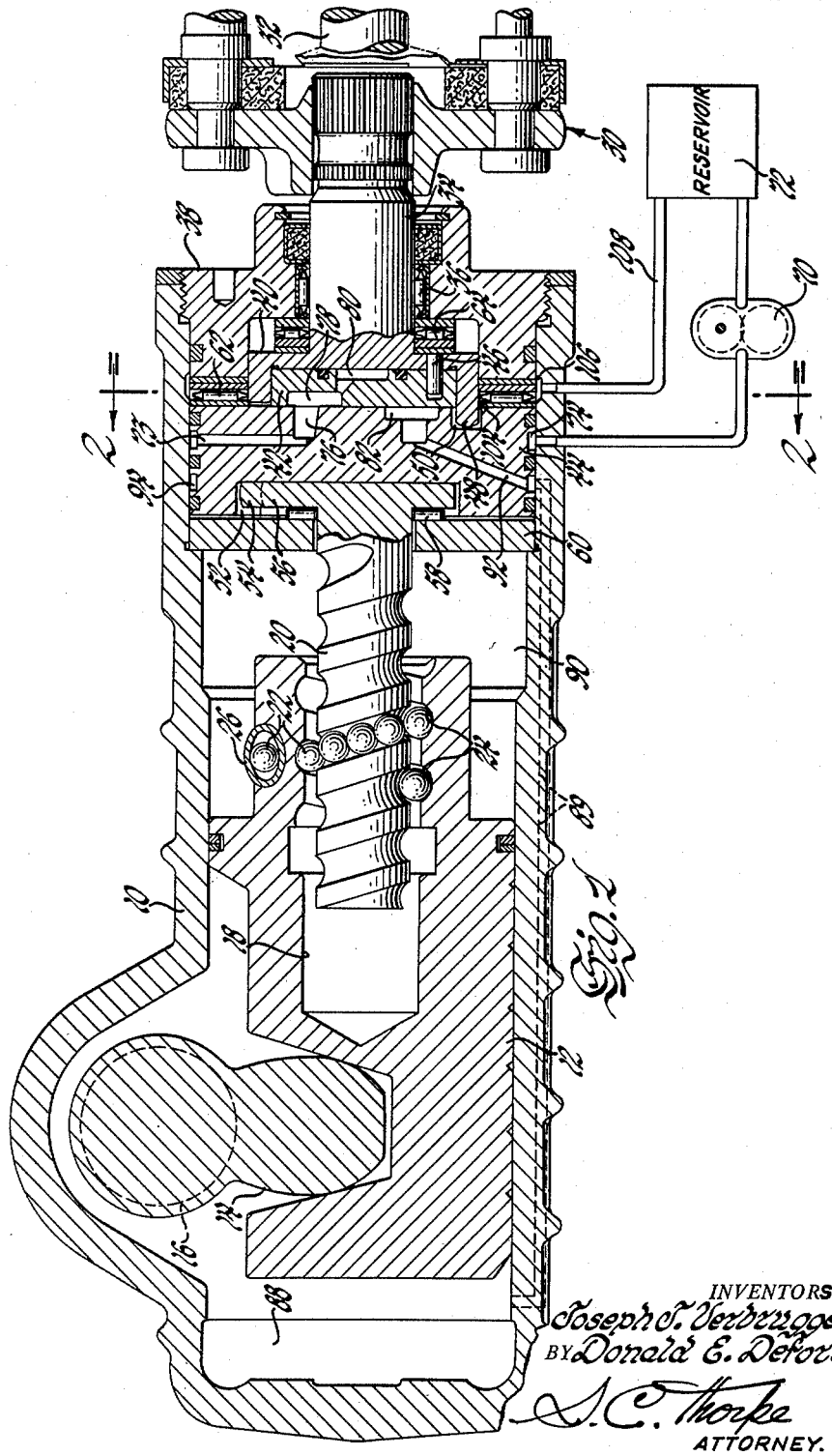
Fig. 1 is a longitudinal section, with certain auxiliary parts illustrated diagrammatically.

Referring first to Figure 1, the numeral 10 denotes a power cylinder which, as installed in the vehicle, is located within the engine compartment in the space normally occupied by the gear box. A piston 12 within cylinder 10 is recessed to accommodate a short lever arm 14 integral with cross-shaft 16 connected outward of the cylinder to the usual pitman arm, not shown.

Piston 12 comprises a bore 18 for the reception of a worm 20 connected to the piston via balls 22 which, in operation of the assembly, follow a helical path provided by the worm groove and a helical groove 24 formed within the bore 18. Return tube 26 provides for recirculation of the balls 22.

Rightward of the cylinder 10 is a flexible coupling 30 to which the steering shaft 32 is connected as described, for example, in U.S. Patent No. 2,753,848 to Robert W. Burton. Coupling 30 serves to mitigate road shocks and, additionally, facilitates solution of alignment problems at assembly.

A stub shaft 34 has a splined connection with the inner component of the coupling 30 and is adapted to rotate in bearings 36 surrounded by the cylinder cover 38. The stub shaft carries a flange 40 mechanically connected to plates 42 and 44 which, with the surrounding portion of the cylinder 10, constitute the control valve component of the power steering gear. In the case of the particular embodiment, the connection with the plate 42 is effected by pins 46 carried by the plate and fitting into corresponding holes in the stub shaft flange 40, while the connection with the plate 44 is made through lugs 48 carried by the flange portion 40 and accommodated in slots 50 formed in the plate 44. Pins 46 preclude relative rotary movement between the shaft 34 and the plate 42. Slots 50, on the other hand, allow for a predetermined limited amount of rotary movement of the stub shaft and plate 42 relative to plate 44.

At the opposite face of valve plate 44, a plurality of radial slots 52 in the plate receive extending lugs 54 carried by the flange portion 56 of the worm 20. Bearings 58 positioned between the inner face of flange 56 and a backing plate 60 shouldered into the cylinder 10, with bearings 62, located about the flange portion 40 of the stub shaft 34, serve to take thrust loads in the operation of the gear. Thrust loads are also taken by bearings 64 located between the cover 38 and the stub shaft flange 40.

Figure 2:
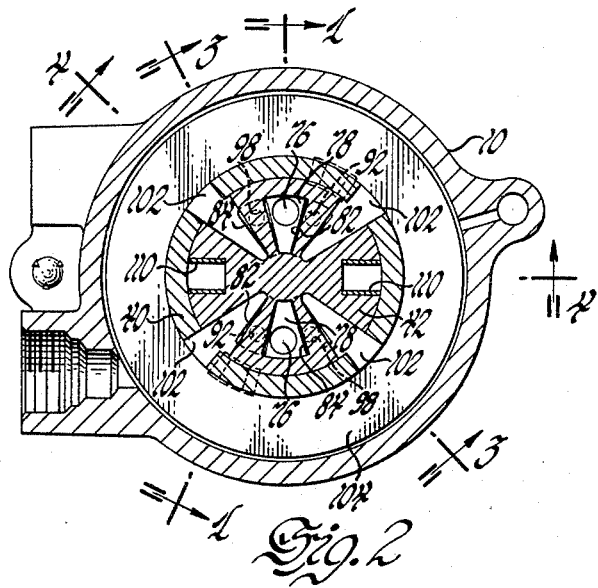
Fig. 2 is a section on the line 2—2 in Fig. 1.

A pump 70, drawing from a reservoir or sump 72, develops the fluid pressure necessary for the operation of the system. The pressure fluid from the pump enters the cylinder 10 through a port therein connecting with an annular groove 74 on the outer diameter of the valve plate 44. Groove 74 in turn opens via passages 73 to two diagrammatically opposite ports 76 (Fig. 2) in the right-hand face of the plate 44. These ports 76 communicate with pockets 78 in the valve plate 42. Another pocket 80 in the latter plate (Fig. 1) receives fluid from the pockets 78 to the end that a fluid force is developed which reacts against plate 42 to hold the faces of the two plates together.

Figure 3:
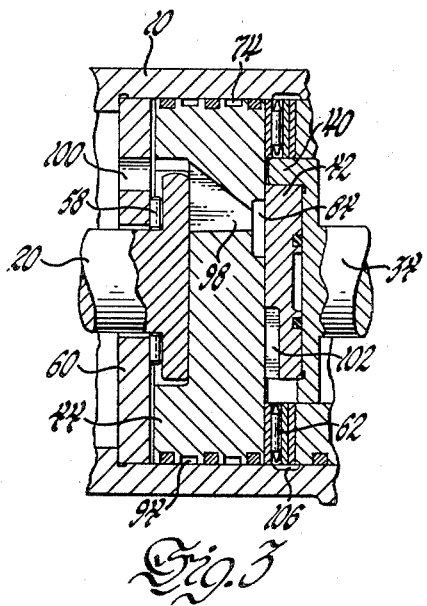
Fig. 3 is a section on the line 3—3 in Figure 2.

Adjacent ports 76 in plate 44 (Fig. 2) and overlapping pockets 78 in plate 42 are port pockets 82 and 84, these being respectively connected to the left-hand and right-hand chambers of the cylinder 10. Such chambers are denoted by the numerals 88 and 90 in Figure 1. In the case of the port pockets 82, the connection with the chamber 88 is effected via passages 92 leading to an annular groove 94 in the outer diameter of the plate 44, this groove being open to a drilled passage 89 in the cylinder 10. In the case of the port pockets 84, the connection to the chamber 90 is effected by passages 98 and 100 (Figure 3) provided respectively in valve plate 44 and backing plate 60.

In addition to port pockets 78, valve plate 42 has therein four return pockets 102 which communicate with the reservoir 72 via the annular bearing space 104 (bearings 62) to which all of the pockets 102 open. As shown in Fig. 1, the cylinder 10 is formed to provide an annular groove 106 opening to the bearing space 104 and communicating with the reservoir via a line 108.

Figure 4:
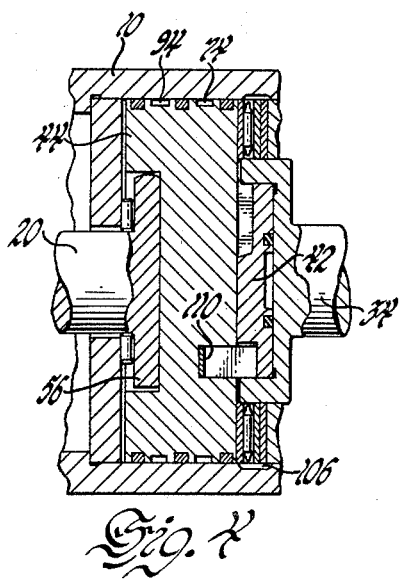
Fig. 4 is a section on the line 4—4 in Fig. 2.

Stub shaft 34 and valve plate 42, as previously brought out, are unified by pins 46 and are rotatable relative to the plate 44 to a predetermined extent set by the sizing of the slots 50 relative to lugs 48. This relative rotary movement is resisted by a pair of U-shaped springs 110 located as best shown by Fig. 4 and normally maintaining the two plates in centered relation. These springs, of course, are effective in either direction of rotation of the stub shaft and the plate 42.

*Operation*

During normal straight-ahead driving, as down a highway, the springs 110 tend to maintain the valve plates in their centered relation. At higher speeds when the steering resistance is low the incidental steering required to maintain the straight course may be accomplished through the springs without relative movement of the valve plates. In the absence of such movement all of the pockets or cavities 78, 82, 84 and 102 are interconnected. Thus, the fluid supplied by the pump 70, which should be considered as in constant operation so long as the vehicle engine is running, circulates through the valve body and back to the reservoir 72 against the static pressure of the fluid in the passages extending to the cylinder chambers 88 and 90.

Now assuming a right turn, for example, and assuming further that the steering resistance or load is such as to bring about yielding of the springs 110, the torque applied to the stub shaft 34 through the steering shaft 32 serves to rotate the valve plate 42 clockwise relative to the valve plate 44, changing the relationship of the pockets so that (1) the gap between the cylinder or power pockets 84 and the adjacent return pockets 102 is increased;

(2) the gap between the cylinder or power pockets 84 and the pressure pockets 78 is decreased;

(3) the gap between the cylinder or power pockets 82 and the adjacent return pockets 102 is decreased; and (4) the gap between the cylinder or power pockets 82 and the pressure pockets 78 is increased.

As a consequence of the foregoing, more pressure fluid is directed to the chamber 88 than to the chamber 90, with the result that a pressure differential develops across the piston 12 in favor of the chamber 88 and the desired assist provided. It should be understood that the extent of the displacement of the plate 42 relative to the plate 44 is a function of the steering resistance. Thus during parking, when steering resistance is highest, the plate 42 may be fully displaced, in which case the flow of pressure fluid to the chamber 90 during rightward swinging of the dirigible wheels may be nil and chamber 88 may be completely shut off from the return line to the reservoir.

It is believed unnecessary to describe the operation of the valve parts incident to a left turn, since the action is just the opposite of that described.

In the event of a power failure, a vehicle equipped according to the invention is still readily steerable through engagement of the stub shaft lugs 48 with the walls of the slots 50 in the valve plate 44. Such engagement is preceded, of course, by deflection of the centering springs 110.

What is claimed is:

1. A valve adapted for use in fluid power steering, said valve comprising a body portion having therein inlet and outlet ports disposed with their axes generally normal to the axis of such portion, a first member rotatable within said body portion, a second member rotatable within said body portion and having a lost motion connection with said first member, means for maintaining said members in close face-to-face relation, and yieldable means associated with said members and tending to resist relative rotation thereof within the limits of said lost motion connection, said members having in their opposed faces a plurality of cavities coacting in use of the valve to control fluid flow, one of said cavities opening to passage means communicating with said inlet port, another of said cavities being open to passage means communicating with said outlet port.

2. A valve adapted for use in fluid power steering, said valve comprising a body portion having therein inlet and outlet ports disposed with their axes generally normal to the axis of such portion, a first member rotatable within said body portion, a second member rotatable within said body portion and having a lost motion connection with said first member, a thrust element adjacent said second member within said body portion, means for applying fluid pressure against said first member to maintain said members in close face-to-face relation, said pressure acting in the direction of said thrust element, and yieldable means associated with said members and tending to resist relative rotation thereof within the limits of said lost motion connection, each of said members having in its face opposing the other member a plurality of cavities operating in use of the valve to control fluid flow, at least one of the cavities in one of said members opening to passage means communicating with said inlet port, at least one of the cavities in the other of said members being open to passage means communicating with said outlet port.

3. A valve for use in power steering, said valve comprising a body portion having therein inlet and outlet ports disposed with their axes generally normal to the axis of such portion, a first member rotatable within said body portion, a second member rotatable within said body portion and having a lost motion connection with said first member, a thrust element adjacent said second member within said body portion, means for applying fluid pressure against said first member to maintain said members in close face-to-face relation, said pressure acting on the direction of said thrust element, and yieldable means associated with said members and tending to resist relative rotation thereof within the limits of said lost motion connection, said first member having a pressure port and a power pocket in its face adjacent said second member, said second member having in its face adjacent said first member a pressure pocket and a return pocket coacting with the said port and the said pocket in the face of said first member to control fluid flow, said pressure port being open to a passage in said first member communicating with said inlet port, said return pocket being open to a passage provided by said body portion communicating with said outlet port.

4. A valve adapted for use in fluid power steering, said valve comprising a body portion having therein inlet and outlet ports disposed with their axes generally normal to the axis of such portion, a first member rotatable within said body portion, a second member rotatable within said body portion and having a lost motion connection with said first member, a thrust element adjacent said second member within said body portion, means for applying fluid pressure against said first member to maintain said members in close face-to-face relation, said pressure acting in the direction of said thrust element, and yieldable means associated with said members and tending to resist relative rotation thereof within the limits of said lost motion connection, said first member having a pressure port and a pair of power pockets in its face adjacent said second member, said power pockets being located one at either side of said pressure port, said second member having in its face adjacent said first member a pressure pocket open to said pressure port and centered between said power pockets in overlapping relation thereto and further having in its said face a pair of return pockets, these being located generally outwardly of said power pockets but overlapping the same, said pressure port being open to a passage in said first member communicating with said inlet port, said return pockets being open to a passage provided by said body portion communicating with said outlet port.

5. A valve adapted for use in fluid power steering, said valve comprising a body portion having therein inlet and outlet ports disposed with their axes generally normal to the axis of such portion, a first member rotatable within said body portion, a second member rotatable within said body portion and having a lost motion connection with said first member, a thrust element adjacent said second member within said body portion, means for applying fluid pressure against said first member to maintain said members in close face-to-face relation, said pressure acting in the direction of said thrust element, and spring means accommodated in cooperating recesses formed in said members and tending to resist relative rotary motion thereof within the limits of said lost motion connection, said first member having a pair of annular grooves about the periphery thereof and having in its face adjacent said second member a pressure port connected to one of said grooves and a power pocket connected to the other of said grooves, said second member having in its face adjacent said first member a pressure pocket and a return pocket coacting with the said port and the said pocket in the face of said first member to control fluid flow, said one of said grooves communicating with said inlet port, said return pocket opening to a passage provided by said body portion communicating with said outlet port.

6. A valve adapted for use in fluid power steering, said valve comprising a body portion having therein inlet and outlet ports disposed with their axes generally normal to the axis of such portion, a first member rotatable within said body portion, a second member rotatable within said body portion and having a lost motion connection with said first member, a thrust element adjacent said second member within said body portion, means for applying fluid pressure against said first member to maintain said members in close face-to-face relation, said pressure acting in the direction of said thrust element, and a U-shaped spring accommodated in cooperating recesses formed in said members and tending to resist relative rotary motion thereof within the limits of said lost motion connection, said first member having a pair of annular grooves about the periphery thereof and having in its face adjacent said second member a pressure port connected to one of said grooves and a pair of power pockets one of which is connected to the other of said grooves, said second member having in its face adjacent said first member a pressure pocket open to said pressure port and centered between said power pockets in overlapping relation thereto and further having in its said face a pair of return pockets located generally outwardly of said power pockets but overlapping the same, said one of said grooves communicating with said inlet port, said return pocket opening to an annular passage provided by said body portion communicating with said outlet port.

7. A valve according to claim 6 wherein said first member further comprises a passage generally paralleling the axis thereof and extending from the other of said power pockets.

References Cited in the file of this patent

UNITED STATES PATENTS

| | | |
|---|---|---|
| 1,657,412 | Schneider | Jan. 24, 1928 |
| 1,777,303 | Goldsmith | Oct. 7, 1930 |
| 1,907,211 | Moffet | May 2, 1933 |
| 2,081,054 | Kenyon | May 18, 1937 |
| 2,196,539 | Sperry | Apr. 9, 1940 |
| 2,410,049 | Davis | Oct. 29, 1946 |